US009660286B1

(12) United States Patent
McNeilly

(10) Patent No.: US 9,660,286 B1
(45) Date of Patent: *May 23, 2017

(54) METHOD FOR ASSEMBLY OF A MICROBIAL FUEL CELL

(71) Applicant: Frank J. McNeilly, Portsmouth, RI (US)

(72) Inventor: Frank J. McNeilly, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 347 days.

This patent is subject to a terminal disclaimer.

(21) Appl. No.: 14/222,771

(22) Filed: Mar. 24, 2014

(51) Int. Cl.
*H01M 8/16* (2006.01)
*H01M 8/02* (2016.01)

(52) U.S. Cl.
CPC ............... *H01M 8/16* (2013.01); *H01M 8/02* (2013.01); *H01M 2250/10* (2013.01)

(58) Field of Classification Search
CPC ........................................................ H01M 8/16
See application file for complete search history.

(56) References Cited

U.S. PATENT DOCUMENTS

| 6,913,854 | B1 * | 7/2005 | Alberte ................. H01M 4/90 429/119 |
| 8,715,867 | B1 * | 5/2014 | McNeilly ........... H01M 4/8626 429/2 |
| 2009/0253190 | A1 * | 10/2009 | Chidambaram ........ C12P 3/00 435/161 |
| 2010/0081014 | A1 * | 4/2010 | Tyce ................... H01M 10/441 429/2 |
| 2011/0104518 | A1 * | 5/2011 | Tender ............... H01M 4/8626 429/2 |
| 2013/0344400 | A1 * | 12/2013 | Girguis .............. H01M 8/1018 429/401 |

* cited by examiner

*Primary Examiner* — Barbara Gilliam
*Assistant Examiner* — Nathanael Zemui
(74) *Attorney, Agent, or Firm* — James M. Kasischke; Jean-Paul A. Nasser; Michael P. Stanley

(57) ABSTRACT

An anode/cathode system is disclosed for use in a Benthic microbial fuel cell. Carbon cloth forms at least a portion of the anode and is disposed on one side of a water oxygen impermeable layer, which can be weighted around a periphery thereof to hold the anode against a water-sediment interface. Carbon cloth flaps or strands can be attached to the other side of the impermeable layer to form the cathode. The anode and cathode can be divided into sections with each section having an electrical lead coupled thereto. The system is deployed onto the seafloor with the anode side in contact with the water-sediment interface.

5 Claims, 3 Drawing Sheets

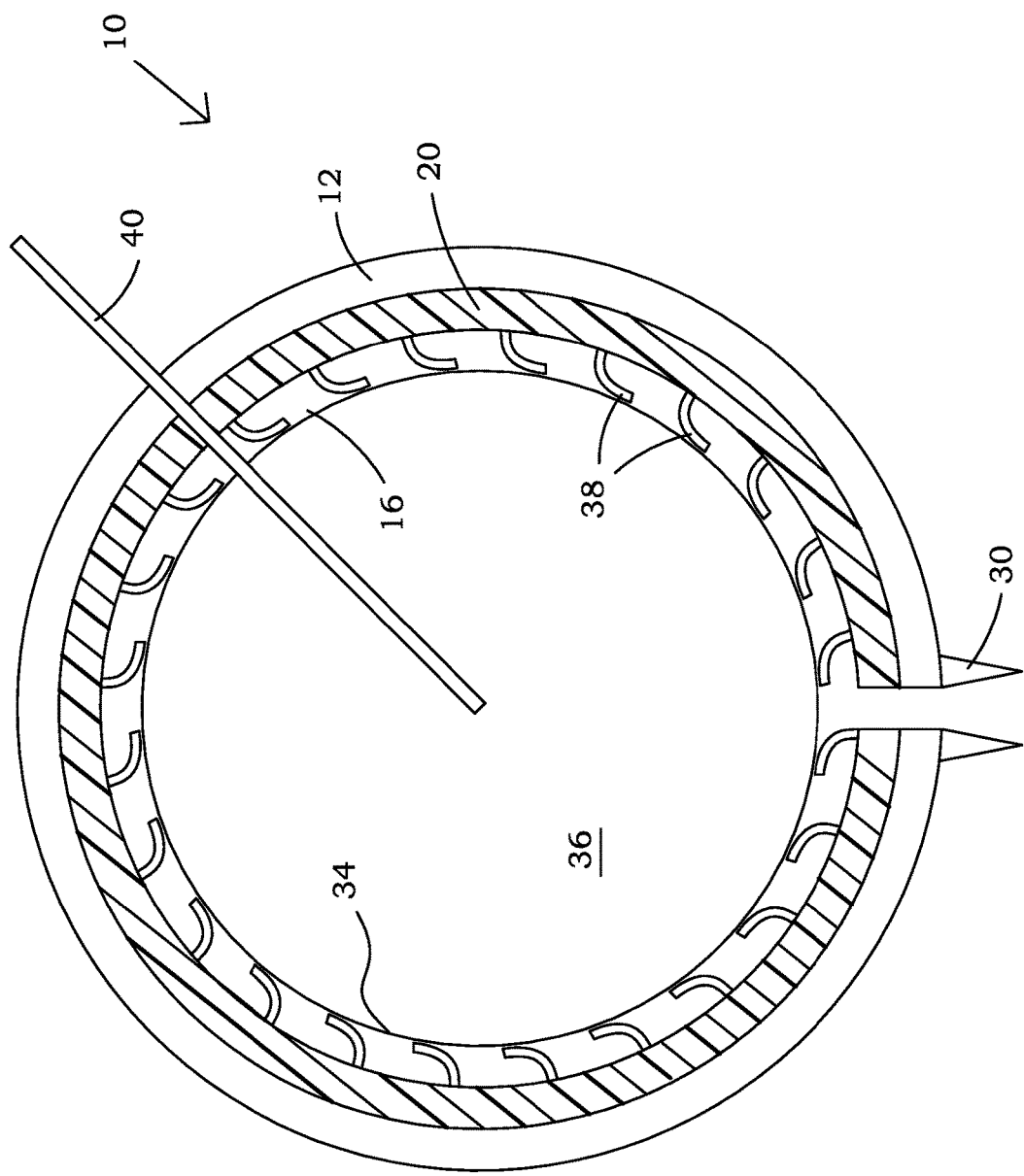

METHOD FOR ASSEMBLY OF A MICROBIAL FUEL CELL

STATEMENT OF GOVERNMENT INTEREST

The invention described herein may be manufactured and used by or for the Government of the United States of America for governmental purposes without the payment of any royalties thereon or therefore.

This application is a divisional of co-pending prior U.S. patent application Ser. No. 13/227,698 filed on 8 Sep. 2011 and claims the benefit under 35 U.S.C. §121 of the prior application's filing date.

CROSS REFERENCE TO OTHER PATENT APPLICATIONS

This patent application is co-pending with the following related U.S. patent application Ser. No. 13/227,698 by the same inventor, Frank J. McNeilly.

BACKGROUND OF THE INVENTION (1) Field of the Invention

The present invention relates generally to a benthic microbial fuel cell and, more particularly, relates to a readily deployable microbial fuel cell, which may be towed into position by cable for deployment on a sea bottom without the need for divers.

(2) Description of Prior Art

A simple Benthic microbial fuel cell (BMFC) system consists of an anode, a cathode and an intermediate electrical circuit. Both the anode and cathode are typically made from carbon or graphite. The anode electrode is buried in the marine sediment to a depth sufficient to sustain anaerobic microbial activity. This step is time consuming and costly. A cathode is also located in the ocean water, usually immediately above the buried anode. Electrical wires connect the anode and cathode to an intermediate electrical circuit that may boost the voltage and store electrical energy or operate an underwater electrical device. The BMFC system generates electrical power by oxidizing sediment organic matter and simultaneously reducing oxygen dissolved in the overlying water as discussed below, e.g., in U.S. Pat. No. 6,913,854. This process generates a sustainable voltage gradient that can be used to generate electrical power.

Prior art microbial fuel cells have disadvantages. Previous systems required divers to install graphite plates in the marine sediment. As noted above, this is a costly and time consuming process. In addition, the graphite plate electrodes are delicate and difficult to handle during an undersea deployment.

The following U.S. Patents describe various prior art systems that may be related to the above and/or other microbial fuel cells:

U.S. Pat. No. 5,288,564 to Klein et al., issued Feb. 22, 1994, discloses a battery including a plurality of series connected battery cells rolled into a cylindrical form. Each of the battery cells includes a thin flexible rectangular anode closely spaced apart from a thin flexible cathode. The plurality of series connected battery cells are placed on a flexible carrier sheet which is tightly wound into the cylindrical form.

U.S. Pat. No. 5,424,147, to Khasin et al., issued Jun. 13, 1995, discloses a water-activated, deferred-action battery having a housing containing at least one cell, comprising at least one anode selected from the group consisting of magnesium, aluminum, zinc and alloys thereof; a cathode comprising a skeletal frame including conductive metal and having a portion of its surface area formed as open spaces, and further comprising a heat-pressed, rigid static bed of active cathode material encompassing the skeletal frame. The cathode material is formed of cuprous chloride, sulfur, carbon and a water-ionizable salt and being compacted and fused under pressure and heat to itself and to the skeletal frame, to form a heat-fused, conductive, electrochemically active phase. At least one cavity separates the cathode and the at least one anode, and at least one aperture leading to the at least one cavity for the ingress of an electrolyte-forming, aqueous liquid.

U.S. Pat. No. 5,427,871, to Garshol et al., issued Jun. 27, 1995, relates to galvanic seawater cells and batteries and in particular to cathodes which are suitable for use in galvanic cells that use an oxidant dissolved in the electrolyte as depolarizer. An example of such cells are seawater cells which use the oxygen dissolved in the seawater as oxidant. The cell has an inert electrode which consists of a number of conducting fibers connected to a conducting body. The fibers have different orientations relatively to each other and to the body. The electrode body consists of two or more wires which are twisted together to constitute an electrode stem while clamping the fibers in a fixed position between the wires, as in a laboratory bottle brush.

U.S. Pat. No. 6,379,835, to Kucherovsky et al., issued Apr. 30, 2002, discloses a flexible thin film battery including a film layer and a porous cathode deposited on a portion of a film and a porous anode deposited on a portion of the film, with an electrolyte and separator layer positioned between the porous anode and the porous cathode. The electrolyte is preferably dried so the battery is activated when liquid contacts the electrolyte and separator layer. Water swellable particles are included in the cell. The film layers are least partially sealed around the edges, confining the anode, cathode, and electrolyte and separator layer. The method of producing such a battery preferably includes printing various inks in a pattern on a polymeric film.

U.S. Pat. No. 6,913,854, to Alberte et al., issued Jul. 5, 2005, discloses a method and apparatus for generating power from voltage gradients at sediment-water interfaces or within stratified euxinic water-columns. Natural voltage gradients typically exist at and about sediment-water interfaces or in isolated water bodies. One electrode (anode) is positioned in the sediment or water just below the redox boundary and the other electrode (cathode) is positioned in the water above the redox boundary over the first electrode. The anode is lower in voltage than the cathode. Current will flow when the electrodes are connected through a load, and near-perpetual generating of worthwhile power may be sustained by the net oxidation of organic matter catalyzed by microorganisms.

U.S. Pat. No. 7,550,224, to Tender et al., issued Jun. 23, 2009, discloses an apparatus having a metallic manganese anode; a cathode capable of reducing at least one species found in marine water; and a rig coupled to the anode and the cathode capable of maintaining the anode below a marine sediment surface and maintaining the cathode above marine the sediment surface. A method of generating power by: positioning in marine sediment a metallic manganese anode; positioning in marine water a cathode capable of reducing at least one species found in marine water; and connecting electrical leads between the anode, the cathode, and an electrical load.

United States Patent Application 2010/0081014, to Robert Tyce et al., issued Apr. 1, 2010, discloses a microbial fuel cell power system based on a microbe-based fuel cell such as a benthic microbial fuel cell (BMFCs). In accordance with the present invention, one or more BMFCs can be connected to one or more batteries such as a nickel metal hydride (NiMH) or sealed lead acid (SLA) battery and can be used to charge the batteries for long-term persistent underwater use. At any time, some of the connected batteries are being charged by the BMFC, while the others are being used to power a connected device. By using electrically isolated fuel cell converters, the batteries can be charged while in circuit. With non-isolated converters, pairs of batteries can be switched between offline charging and online discharging. The battery system can be controlled by a control system that comprises a microcontroller that periodically measures system voltages and currents, swaps the batteries being charged, and records the system results for post-mission analysis. The batteries can be connected to an underwater monitoring system such as the Acoustic Doppler Current Profiler (ADCP) or Shallow-Water Environmental Profiler in Trawl-Safe Real-Time Configuration (SEPTR) systems used by the U.S. Navy and can provide long-term persistent power supplies to such systems.

The above discussed prior art does not address solutions provided by the present invention, which teaches a more easily deployed microbial fuel cell configuration.

Consequently, those skilled in the art will appreciate the present invention that addresses the above described and other problems.

SUMMARY OF THE INVENTION

An object of the present invention is to provide an improved microbial fuel cell.

Another object of the present invention is provide a microbial fuel cell that may be deployed at a water-sediment interface utilizing a cable, without the need for burying the anode under the seabed.

Yet another object of the present invention is to provide a microbial fuel cell, which does not require divers during deployment on the ocean floor.

Accordingly, the present invention comprises a microbial fuel cell assembly, which electrically interacts with an underwater surface. One embodiment of the invention may comprise elements such as, for example, a flexible anode electrode that may comprise a plurality of anode sections, and a corresponding plurality of anode electrical conductors, which are connected to the plurality of anode sections. A plurality of anodes and cathodes are provided as a redundancy in case part of the overall BMFC is damaged, the BMFC will continue to operate.

The invention may further comprise a flexible cathode electrode, which may comprise a plurality of cathode sections. A plurality of cathode electrical conductors may then be connected to the plurality of cathode sections.

The flexible anode electrode is attached to one side of an oxygen impermeable separation layer, and the flexible cathode electrode is attached to an opposite side of the oxygen impermeable separation layer.

In a presently preferred embodiment, the flexible anode electrode and the flexible cathode electrode comprise carbon fiber cloth. The flexible cathode electrode may comprise a plurality of flaps or other area of increasing elements.

The microbial fuel cell assembly may comprise weighted portions on a periphery of the oxygen impermeable separation layer, which holds the microbial fuel cell against the underwater surface such as the ocean floor, seabed, or the like. The weighted periphery provides an oxygen impermeable separation enclosure for the anode while pressed against the sea floor. For purposes of the present invention, terms such as ocean floor, seabed, underwater surface, lake bed, and the like, are essentially interchangeable.

The microbial fuel cell assembly may comprise a plurality of spikes mounted on the flexible anode electrode side of the oxygen impermeable separation layer to secure the assembly on the ocean bed in an anode downwardly facing configuration.

In a presently preferred embodiment, the flexible anode electrode, the flexible cathode electrode, and the oxygen impermeable separation layer are wrapped around a cylinder which is heavy enough to sink to the seabed for deployment to the seabed without the need for divers.

In another embodiment, a method for assembly of the microbial fuel cell may comprise steps such as, for example, forming a flexible anode electrode utilizing a plurality of anode sections, and forming a flexible cathode electrode utilizing a plurality of cathode sections. The method further comprises attaching the flexible anode electrode to one side of the oxygen impermeable separation layer and attaching the flexible cathode electrode to an opposite side of the oxygen impermeable separation layer.

Other steps may comprise deploying the microbial fuel cell onto the underwater surface whereby the flexible anode electrode contacts the underwater surface.

In one embodiment, the method may comprise forming the flexible anode electrode and the flexible cathode electrode utilizing carbon fiber cloth. The method may further comprise forming the flexible cathode electrode utilizing a plurality of flaps or other flexible members such as strands or ropes to increase the surface area.

The method may comprise mounting weighted portions on a periphery of the oxygen impermeable separation layer to hold the microbial fuel cell onto the sea bottom and/or mounting a plurality of spikes on the flexible anode electrode side of the oxygen impermeable separation layer.

In a presently preferred embodiment, the method may comprise wrapping the flexible anode electrode, the flexible cathode electrode, and the oxygen impermeable separation layer around a deployment cylinder, which is rolled on the seabed to deploy the microbial fuel cell.

In yet another embodiment, the microbial fuel cell assembly may comprise a flexible anode electrode and a flexible cathode electrode, which are attached to opposite sides of an oxygen impermeable separation layer. The cathode, anode, and separation layer are then mounted onto the deployment cylinder. In one embodiment, the flexible anode electrode is positioned more radially exterior on the deployment cylinder than the flexible cathode electrode so that as the microbial fuel cell is unwrapped from the deployment cylinder on the seabed, the anode electrode will then face the seabed.

At least one cable is connected to the deployment cylinder to lower the deployment cylinder to the underwater surface. Weighted portions, which may be positioned on a periphery of the oxygen impermeable separation layer and/or at other positions are of sufficient weight to hold the flexible anode electrode against the underwater surface. The weight of the deployment cylinder aids in pressing the anode and weighted periphery of the oxygen impermeable separation layer against the sea floor to ensure intimate contact.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein:

FIG. 3 is an elevational view, in section, of a microbial fuel cell wrapped on a deployment spool which can be towed into position for deployment on the seabed in accord with one possible embodiment of the present invention.

DETAILED DESCRIPTION OF THE INVENTION

The present invention provides a microbial fuel cell, which greatly improves the ease of deployment as compared to prior art designs. In one embodiment, the present invention provides the ability to simply roll the dual electrode out onto the ocean floor without the need for divers. This configuration and method of deployment significantly reduces deployment costs, time, and the ability to use the microbial fuel cell at greater depths.

Figure 1:
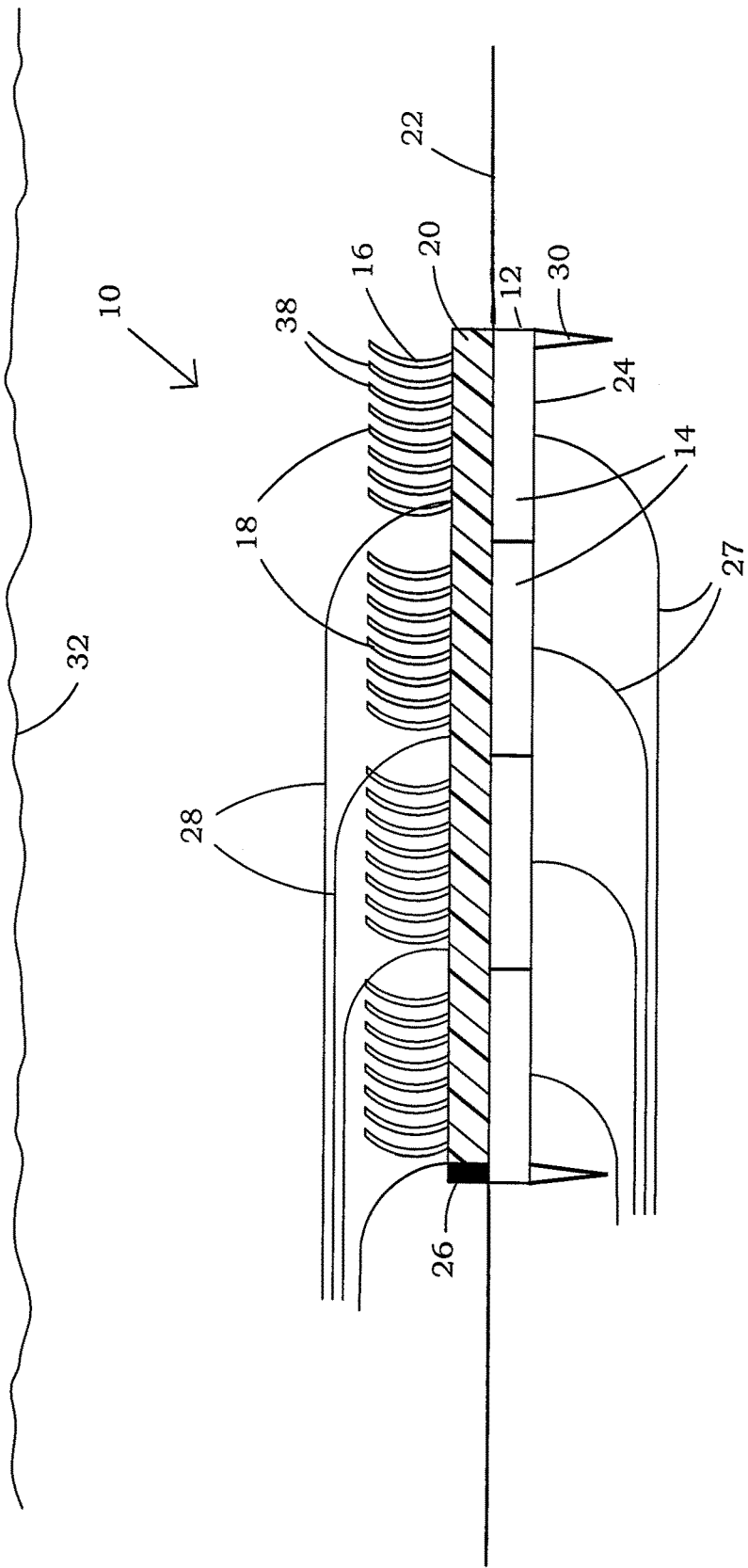
FIG. 1 is a side elevational view, partially in section, which discloses an easily deployable microbial fuel cell positioned on the seabed in accord with one possible embodiment of the invention.
Figure 2:
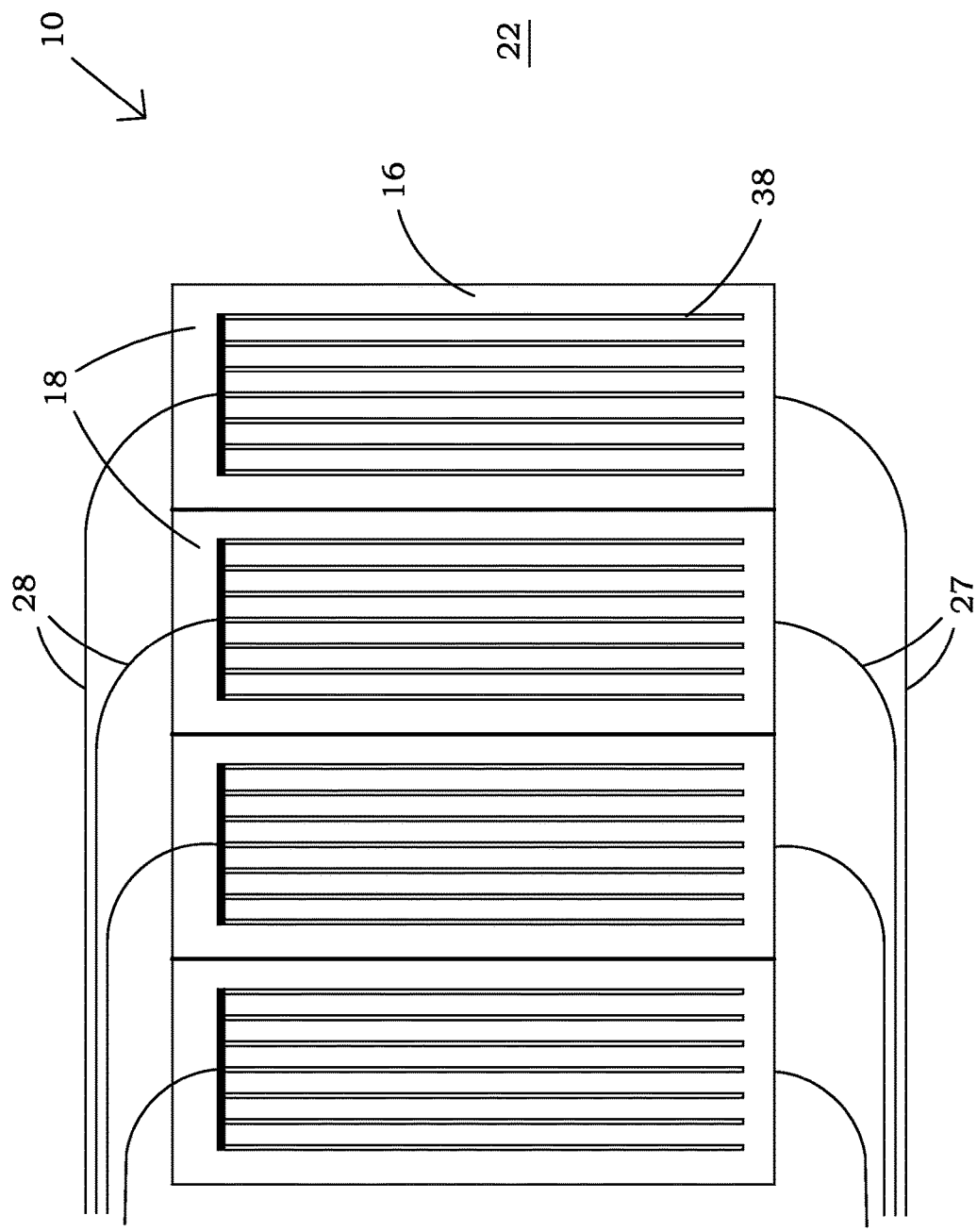
FIG. 2 is a top view of the microbial fuel cell of FIG. 1 in accord with one possible embodiment of the invention.

Referring now to the drawings, and more particularly to FIG. 1 and FIG. 2, there is shown the side (FIG. 1) and top (FIG. 2) of one embodiment of microbial fuel cell 10.

A one-piece dual anode/cathode electrode configuration in accord with one possible embodiment of microbial fuel cell 10 comprises three basic components, anode 12 (which may comprise a plurality of anode sections 14), cathode 16 (which may comprise a plurality of cathode sections 18), and separation layer 20.

Anode 12 may comprise a carbon cloth base layer 24 that will make direct contact with the marine sediment top 22. In one possible preferred embodiment, carbon cloth layer 24 is segmented into multiple anode sections 14. If anode 12 is segmented as shown, the anode sections 14 of anode 12 can then be connected to a plurality of corresponding electrical conductor wires 27 that will lead back to the BMFC electrical circuit (not shown).

Microbial fuel cell 10 further preferably comprises heavy, rubberized material separation layer 20, which adheres to the carbon cloth anode electrode 12. Separation layer 20 is impermeable and may preferably be used to serve at least three purposes.

Separation layer 20 preferably provides weight to hold the electrically conductive carbon cloth anode 12 pressed down on the marine sediment. Separation layer 20 forms a barrier to stop or effectively prevent oxygen from passing from the carbon cloth anode 12 to the surrounding ocean water. Separation layer 20 preferably also provides a barrier to any marine burrowing life that could perforate the anode structure.

In a preferred embodiment, barrier or separation layer 20 may be lined around the circumference with a thicker, heavy duty lining 26 that is weighted and/or may comprise other types of weights positioned as desired to keep microbial fuel cell 10 on sea floor 22 beneath water surface 32.

The upper portion during operation at the seabed of the dual electrode configuration of microbial fuel cell 10 (as shown in FIG. 1 and FIG. 2) is cathode electrode layer 16. Cathode electrode layer 16 may preferably be formed utilizing an array of flexible carbon cloth flaps, which may be organized in sections to provide cathode electrode sections 18.

When cathode electrode 16 of this embodiment is arranged in cathode electrode sections 18, the groups of the carbon cloth flaps are then segmented into separate conductor circuits and wired separately, as indicated by wires 28, which connect to the BMFC control circuit. Each anode electrode section 14 and corresponding cathode electrode section 18 are then preferably wired separately and effectively provide separate power supplies.

Providing a plurality of anode sections 14 and cathode sections 18 in segments of carbon cloth conductors ensures that if one section of the electrodes is damaged or compromised, the other sections will be able to continue operating and the electric circuit will not be compromised. In addition, separating large electrodes into segments reduces the overall electrode resistance, which has a large impact on low-voltage electrical energy storage systems.

In one embodiment, spikes 30 may be located at each corner of the dual electrode to anchor microbial fuel cell 10 in the marine sediment 22.

In one embodiment, providing louvers or flaps 38 as shown in the figures for cathode 16 provides a large surface area to facilitate the oxygen reduction process of microbial fuel cell 10. In a preferred embodiment, carbon fiber cloth is selected because of the high electrical conductivity and flexibility thereof. In an alternative embodiment, cathode 16 and/or anode 12 may comprise carbon fiber cloth of a more fibrous texture with loose strands as opposed to a tight woven texture. The loose strands may provide increased surface area for both electrodes, thereby increasing the reduction and oxidation processes.

FIG. 3 shows a presently preferred embodiment of microbial fuel cell 10 in a deployed configuration. For deployment, the dual electrode microbial fuel cell 10 would be wrapped around periphery 34 of weighted cylindrical spool 36 with the spikes and anode electrode 12 facing outwardly.

During deployment, cylindrical spool 36 would be lowered to sea floor 22 utilizing cables 40, which may connect to a central portion of each end of cylindrical spool 36. If desired, a latching mechanism (not shown) may be utilized to permit release of the layers of microbial fuel cell 10 from cylindrical spool 36. In another embodiment, one set of spikes 30 may be longer and/or driven into sea bottom 22 utilizing the weight of weighted (and/or flooded) cylindrical spool 36 for deployment purposes.

A ship would slowly pull the assembly forward while the dual electrode microbial fuel cell 10 is unrolled from the spool. Weighted cylindrical spool 36 would then press anode 12 into the sediment as the spool is rolled along the sea floor 22. Once the microbial fuel cell 10 has completely unrolled from cylindrical spool 36, then cylindrical spool 36 will be raised back to the ship.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A method for assembly of a microbial fuel cell which electrically interacts with an underwater surface, comprising:
   providing a flexible anode electrode comprising a plurality of anode sections;

connecting a plurality of anode electrical conductors to said plurality of anode sections;

providing a flexible cathode electrode comprising a plurality of cathode sections;

connecting a plurality of cathode electrical conductors to said plurality of cathode sections;

providing an oxygen impermeable separation layer;

attaching said flexible anode electrode to one side of said oxygen impermeable separation layer;

attaching said flexible cathode electrode to an opposite side of said oxygen impermeable separation layer;

placing weighted portions on a periphery of said oxygen impermeable separation layer; and mounting a plurality of spikes on said flexible anode electrode side of said oxygen impermeable separation layer.

2. The method of claim 1 comprising deploying said microbial fuel cell onto said underwater surface whereby said flexible anode electrode contacts said underwater surface.

3. The method of claim 1 comprising forming said flexible anode electrode and said flexible cathode utilizing carbon fiber cloth.

4. The method of claim 1 comprising forming said flexible cathode electrode utilizing a plurality of flaps.

5. A method for assembly of a microbial fuel cell which electrically interacts with an underwater surface, comprising:

providing a flexible anode electrode comprising a plurality of anode sections;

connecting a plurality of anode electrical conductors to said plurality of anode sections;

providing a flexible cathode electrode comprising a plurality of cathode sections;

connecting a plurality of cathode electrical conductors to said plurality of cathode sections;

providing an oxygen impermeable separation layer;

attaching said flexible anode electrode to one side of said oxygen impermeable separation layer;

attaching said flexible cathode electrode to an opposite side of said oxygen impermeable separation layer;

placing weighted portions on a periphery of said oxygen impermeable separation layer;

mounting a plurality of spikes on said flexible anode electrode side of said oxygen impermeable separation layer; and wrapping said flexible anode electrode, said flexible cathode electrode, and said oxygen impermeable separation layer onto a deployment cylinder.

* * * * *